US008573385B2

(12) United States Patent

Yun

(10) Patent No.: US 8,573,385 B2

(45) Date of Patent: Nov. 5, 2013

(54) CLEANING APPARATUS FOR ESCALATOR RAILS

(75) Inventor: Hyang-Seok Yun, Changwon (KR)

(73) Assignee: Otis Elevator Company, Farmington, CT (US)

( * ) Notice: Subject to any disclaimer, the term of this patent is extended or adjusted under 35 U.S.C. 154(b) by 513 days.

(21) Appl. No.: 12/745,928

(22) PCT Filed: Jan. 15, 2009

(86) PCT No.: PCT/US2009/031072

§ 371 (c)(1),
(2), (4) Date: Jun. 3, 2010

(87) PCT Pub. No.: WO2009/091872

PCT Pub. Date: Jul. 23, 2009

(65) Prior Publication Data

US 2010/0257689 A1 Oct. 14, 2010

(30) Foreign Application Priority Data

Jan. 16, 2008 (KR) .......................... 10-2008-004760

(51) Int. Cl.
*B65G 45/14* (2006.01)

(52) U.S. Cl.
USPC .......................................... 198/498; 198/321

(58) Field of Classification Search
USPC ................................. 198/498, 499, 321, 332
See application file for complete search history.

(56) References Cited

U.S. PATENT DOCUMENTS

| | | | | |
|---|---|---|---|---|
| 2,060,491 | A | 11/1936 | Dunlop | |
| 2,617,515 | A | 11/1952 | Hohnecker | |
| 2,634,850 | A | 4/1953 | Hansen | |
| 2,766,979 | A * | 10/1956 | Calder | 299/82.1 |
| 3,013,651 | A * | 12/1961 | Patz et al. | 198/498 |
| 3,515,260 | A * | 6/1970 | Clyne | 198/499 |
| 3,516,535 | A * | 6/1970 | Patz | 198/498 |
| 4,091,492 | A * | 5/1978 | Thomson et al. | 15/246 |
| 4,146,126 | A * | 3/1979 | Mattos | 198/861.1 |
| 4,416,367 | A * | 11/1983 | Easton et al. | 198/496 |
| 4,623,060 | A | 11/1986 | Rulke | |
| 4,755,252 | A * | 7/1988 | Held | 156/389 |
| 4,946,026 | A * | 8/1990 | Rickman | 198/494 |

(Continued)

FOREIGN PATENT DOCUMENTS

| | | | |
|---|---|---|---|
| JP | 59140264 | U | 9/1984 |
| JP | 2139881 | | 11/1990 |
| KR | 920005924 | Y1 | 8/1992 |
| KR | 960006813 | Y1 | 8/1996 |

OTHER PUBLICATIONS

International Search Report and Written Opinion of the International Searching Authority for International application No. PCT/US2009/031072 mailed Sep. 7, 2009.

(Continued)

*Primary Examiner* — Joseph Dillon, Jr.

(74) *Attorney, Agent, or Firm* — Carlson, Gaskey & Olds

(57) ABSTRACT

An exemplary cleaning apparatus (100) for escalator rails includes an insertion receiver (110) installed in a separation space between step chain rollers (3*a*). At least one cleaning belt (120) extends from the insertion receiver (110), for at least partially wrapping around the step chain rollers (3*a*). A retaining fixture (130) secures ends of the at least one cleaning belt (120) in a fixed position relative to the insertion receiver (110).

9 Claims, 8 Drawing Sheets

(56) References Cited

U.S. PATENT DOCUMENTS

| | | | | |
|---|---|---|---|---|
| 5,080,009 | A * | 1/1992 | Fritz et al. | 100/88 |
| 5,117,968 | A | 6/1992 | Rivera | |
| 5,199,549 | A * | 4/1993 | Lutke | 198/520 |
| 5,715,565 | A | 2/1998 | Kern | |
| 5,893,450 | A * | 4/1999 | Metivier | 198/496 |
| 6,523,664 | B2 * | 2/2003 | Shaw et al. | 193/35 R |
| 6,527,103 | B2 | 3/2003 | Neszmerak | |
| 6,629,596 | B2 * | 10/2003 | Teuber | 198/850 |
| 6,923,312 | B2 * | 8/2005 | Pham et al. | 198/495 |
| 7,204,361 | B2 | 4/2007 | Illedits | |
| 7,232,028 | B2 | 6/2007 | Schulz | |
| 2009/0025752 | A1 * | 1/2009 | Rui | 134/6 |

OTHER PUBLICATIONS

International Preliminary Report on Patentability for International application No. PCT/US2009/031072 mailed Jul. 29, 2010.

* cited by examiner (a) (b)

Key: 1 A-A line (a) (b)

Key: 1 A-A line

CLEANING APPARATUS FOR ESCALATOR RAILS

TECHNICAL FIELD

The present invention pertains to a cleaning apparatus for escalator rails.

DESCRIPTION OF THE RELATED ART

In general, as shown in FIG. 1, an escalator has a structure consisting of a handrail (7) which acts as a handhold and a guide, an upper terminal gear (8) rotated at the upper end of a truss (2), a lower terminal gear (9) connected to and rotated with the terminal gear (8) by a step link (4) at the lower end of the truss (2), multiple steps (3) on which passengers ride, and rails (5*a*, 5*b*, 6*a*, 6*b*) for guiding rollers (3*a*, 3*b*) coupled to the steps (3).

As shown in FIG. 2, step chain rollers (3*a*) and step rollers (3*b*) are respectively axially coupled at the front part and rear part of the lower ends of the steps (3), the connecting parts of the step chain links (4, 4*a*) and their adjacent step chain links (4, 4*b*) are axially coupled with the step chain rollers (3*a*), and front wheel rails (5*a*, 6*a*) and rear wheel rails (5*b*, 6*b*) are installed so that the step chain rollers (3*a*) and step rollers (3*b*) are guided on paths independent of each other.

The multiple steps (3) are continuously moved along the front wheel rails (5*a*, 6*a*) and rear wheel rails (5*b*, 6*b*) and move passengers while ascending or descending. If contaminants such as sand, dust, and waste oil get on or adhere to the front wheel rails (5*a*, 6*a*) or rear wheel rails (5*b*, 6*b*), the steps (3) shake as the step chain rollers (3*a*) or step rollers (3*b*) ride over the contaminants, so that the passengers feel discomfort, and the life of the parts is negatively affected. Also, since the running resistance is increased, power loss results.

As prior art for solving these problems, a guide rail cleaning apparatus for an escalator and an operation control method for the guide rail cleaning apparatus, from Japanese Kokai Patent Application No. 2007-84204 will be briefly explained. FIG. 3 is a side view and a cross section showing a first application example of the guide rail cleaning apparatus for an escalator, and FIG. 4 is a side view and a cross section showing a second application example of the guide rail cleaning apparatus for an escalator.

In the first application example, a cleaner (11) is installed between the step chain rollers (3*a*) by utilizing a space formed between a pair of left and right step chain links (4*b*), and has a structure consisting of movable member (11*a*), cleaner body (11*b*) installed at the bottom of the movable member (11*a*), connecting rods (11*c*) and spring (11*d*) installed between the movable member (11*a*) and cleaner body (11*b*), multiple rollers (11*e*, 11*f*, 11*g*) rotatably mounted on the movable member (11*a*) and cleaner body (11*b*), and brush (11*h*) made of metal installed at the bottom of the cleaner body (11*b*).

In the second application example, a cleaner (12) is installed between the step chain rollers (3*a*) by utilizing fixed surfaces of the step chain links (4*b*) and has a structure consisting of cleaner body (12*a*), brush (12*c*) made of metal installed at the bottom of the cleaner body (12*a*), and retaining fixture (12*d*) for fixing the cleaner body (12*a*) to the step chain links (4*b*).

In the prior art, since the cleaners (11, 12) are installed by utilizing the space formed between the step chain links (4*a*, 4*b*) and the fixed surfaces of the step chain links (4*a*, 4*b*), they are suitable for cleaning front wheel rails that guide the step chain rollers, but since a space in the step chain rollers (3*a*) into which the gear teeth of the upper and lower terminal gears are introduced is occupied by the cleaners (11, 12), there has been the limitation that the cleaners (11, 12) cannot be advanced onto the upper and lower terminal gears.

If the cleaners (11, 12) are advanced up to the upper or lower terminal gear, there is a risk of damage to the escalator structure, as well as damage to the cleaners (11, 12) themselves. Thus, when the cleaners (11, 12) arrive at a position near a terminal gear during operation, cleaning must be carried out while repeatedly reversing the direction of operation, which leaves sections of the rails that cannot be cleaned.

Also, if a detector (23) is installed on the cleaners (11, 12) as a safety device and position detecting sensors are separately attached to the upper and lower parts of the escalator structure, not only are the costs of manufacture and installation required, including the manufacturing cost of the complicated cleaners (11, 12) themselves increased, but also a worker must enter the truss in which the rails are installed, install the cleaners (11, 12) and position detecting sensors, creating the additional problem of safety risks.

SUMMARY

An exemplary cleaning apparatus (100) for escalator rails includes an insertion receiver (110) installed in a separation space between step chain rollers (3*a*) of an associated passenger conveyor. At least one cleaning belt (120) extends from the insertion receiver (110), for at least partially wrapping around step chain rollers (3*a*). A retaining fixture (130) secures ends of the at least one cleaning belt (120) in a fixed position relative to the insertion receiver (110).

In one example, the insertion receiver (110) has a front to rear length corresponding to the separation gap between the step chain rollers (3*a*).

In one example, the insertion receiver (110) is installed with a separation gap from the bottoms of the step chain rollers (3*a*).

The cleaning belt (120) in one example is composed of a fibrous material in which cotton fibers and synthetic fibers are blended, and a sandpaper grit layer preferably coats the contact surface with the front wheel rails.

The retaining fixture (130) can include a first retaining fixture (131) fixedly mounted at the top of the insertion receiver (110) and equipped with a hook catch part (131*a*) projecting to the front (or rear) side, and a second retaining fixture (132) fixedly coupled with the end of the cleaning belt (120) and equipped with a hook part (132*a*) that can be hooked and fixed to the hook catch part (131*a*).

The first retaining fixture (131) sometimes includes a first anti-thrust part (131*b*) equipped with a contact surface for forming a travel limit in the lateral direction and projecting (or recessed), and the second retaining fixture (132) includes a second anti-thrust part (132*b*) recessed (or projecting) so that movement in the lateral direction is limited by the contact with the first anti-thrust part (131*b*).

A separation preventer (133) equipped with a surface that contacts the second retaining fixture (132) may be included and fixedly mounted on the insertion receiver (110) or first retaining fixture (131) to prevent the front (or rear) separation of the second retaining fixture (132) in a state in which the second retaining fixture (132) is connected to the front part (or rear part) of the first retaining fixture (131).

Another example is a rail cleaning apparatus (200) for an escalator equipped with step rollers (3*b*) coupled to steps on which passenger ride and rear wheel rails for guiding the step rollers (3*b*). It includes a connector (210) adapted to be connected to the step rollers (3*b*) and a cleaning belt (220) that is configured to at least partially wrap around the connector and the step roller.

The vertical width of the connector (210) may to be shorter than the diameter of the step roller (3*b*) so that the cleaning belt has a rising angle of inclination toward the front and rear sides from the bottom of the roller and has a falling angle of inclination toward the front and rear sides from the top of the rollers.

Also, it may be preferable for the connecting part between the upper and lower parts and the front or rear parts of the outer surface of the connector (210) to be beveled or rounded.

The various features and advantages of this invention will become apparent to those skilled in the art from the following detailed description. The drawings that accompany the detailed description can be briefly described as follows.

DETAILED DESCRIPTION

The cleaning apparatus for escalator rails of the present invention is useful, for example, with an escalator equipped with rollers (3*a*, 3*b*) coupled with steps on which passengers ride, and rails for guiding the rollers (3*a*, 3*b*). This cleaning apparatus has an installation structure in which cleaning belts (120, 220), made of a material that can absorb or push contaminants, are wrapped around the outer surfaces of at least one of the rollers (3*a*, 3*b*) being moved while in contact with the rails, and the cleaning belts (120, 220) are fixed in regular positions based on the rollers (3*a*, 3*b*) by utilizing an assembly for fixing the cleaning belts (120, 220).

With the installation structure, when the escalator is driven, the cleaning belts (120, 220) in contact with the rail surfaces scrape or wipe off foreign matter that gets onto the rail surfaces while moving with the rollers (3*a*, 3*b*). In the following, the present invention having the installation structure and operation principle will be explained in detail by means of a first application example and second application example.

The first application example of the cleaning apparatus for escalator rails of the present invention will be explained with reference to FIGS. 5-11.

Figure 1:
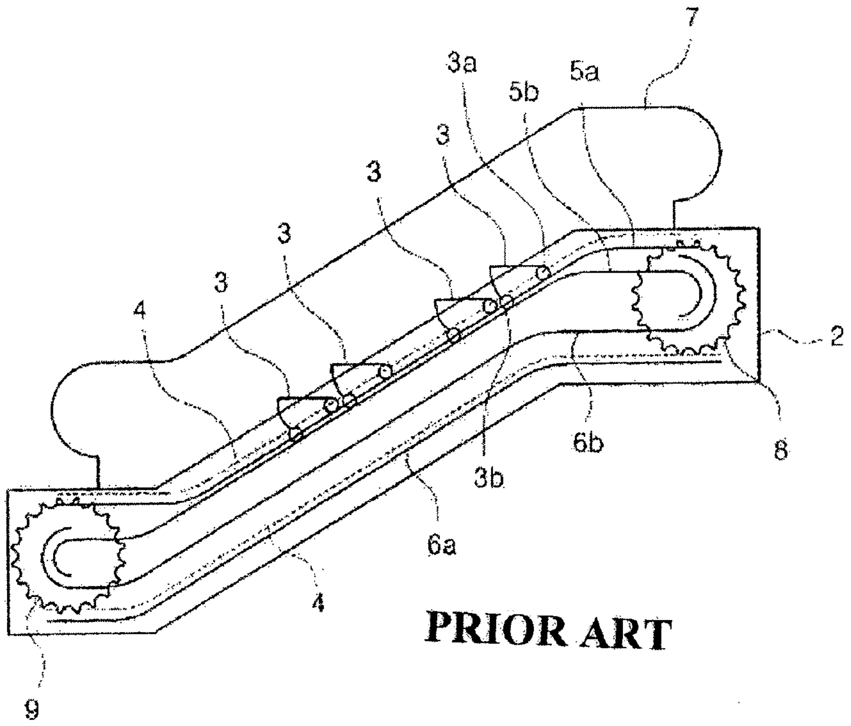
FIG. 1 is a side view showing the main parts in the structure of an ordinary escalator.
Figure 2:
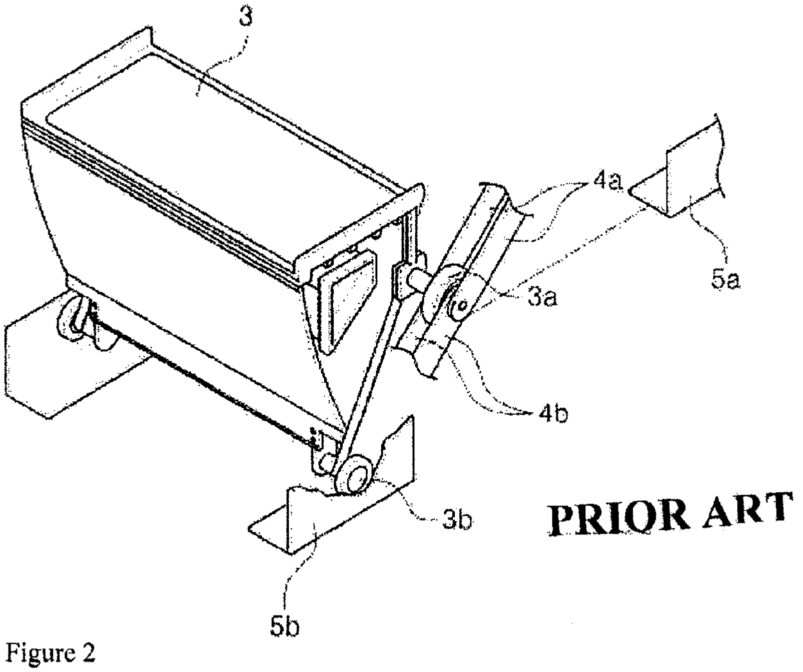
FIG. 2 is an oblique view showing a state in which step chain rollers and step rollers are coupled to steps of the escalator.
Figure 3:
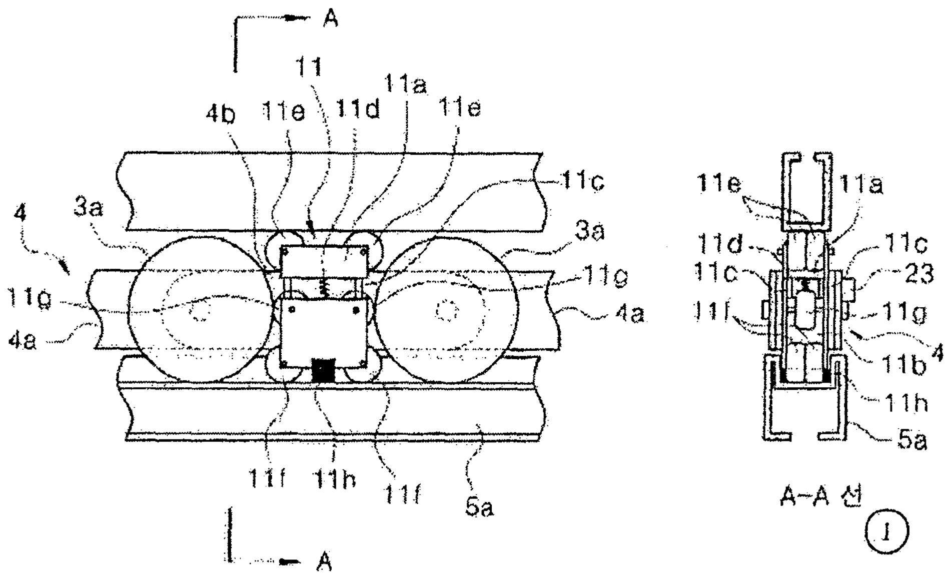
Figure 3 PRIOR ART
FIG. 3 is a side view and a cross section showing a first application example of a front wheel rail cleaning apparatus of the prior art.
Figure 4:
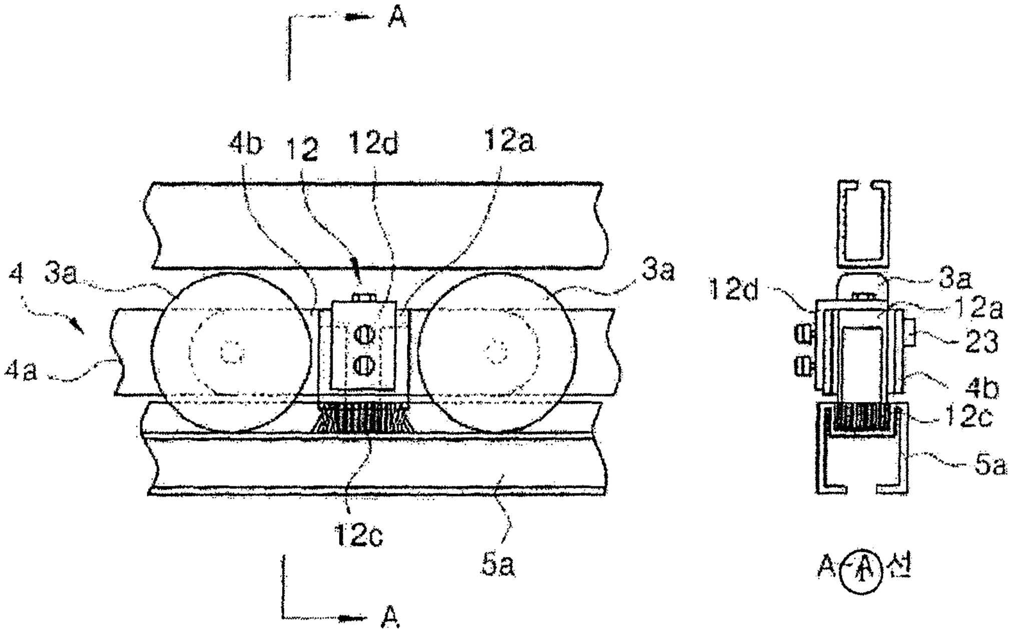
Figure 4 PRIOR ART
FIG. 4 is a side view and a cross section showing a second application example of a front wheel rail cleaning apparatus of the prior art.
Figure 5:
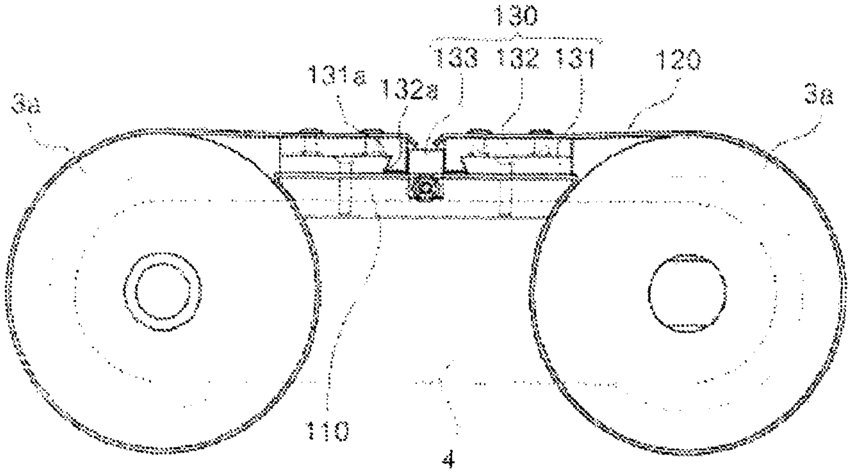
FIG. 5 is a side view showing a state in which the first application example of the cleaning apparatus for escalator rails of the present invention is installed at the rollers.

The first illustrated example of the cleaning apparatus 100 for escalator rails includes an insertion receiver (110), cleaning belt (120), and retaining fixture (130). The apparatus (100) has an installation structure in which the insertion receiver (110) is installed between front and rear rollers (3*a*). The cleaning belt (120) is extended to the front and rear of the insertion receiver (110) and wrapped around the rollers (3*a*). The retaining fixture (130) fixes the end of the cleaning belt (120) to the insertion receiver (110) as shown in FIG. 5.

The insertion receiver (110) provides a reference surface that can sturdily fix the cleaning belt (120) in a regular position based on the rollers (3*a*) so that the cleaning belt (120) is neither pushed out nor tilted to one side, even if an excessive pressure is applied to the front or rear part by friction with the rails and a roller contact surface that can restrain the rollers (3*a*) from rotating at random.

If the insertion receiver (110) is prepared so that it has a front and rear length corresponding to the separation gap between the rollers (3*a*) and the parts connecting with the rollers (3*a*) are shaped to correspond to the outer surfaces of the rollers (3*a*), the reference surface capable of fixing the cleaning belt (120) such that it extends and returns to the front and rear, and the roller connection surface that restrains the rotation of the rollers (3*a*) are formed simultaneously.

The cleaning belt (120) is not limited to a specific material, as long as it can be freely bent and deformed while absorbing or pushing out contaminants that get on or become attached to the rails. In one example, the belt (120) is formed of a fibrous material in which cotton fibers capable of effectively absorbing liquid substances and synthetic fibers having excellent durability when subjected to friction with the rail surfaces are blended. Generally, water absorptivity and durability can be easily realized by applying a belt member used for power transmission.

In case the degree of contaminant attachment is severe, the contaminants will not be effectively removed by only pushing out the upper parts of the contaminants to the front and rear, and abrasion of the cleaning belt (120) is accelerated. In such a case, a sandpaper grit with excellent strength, compared to fibrous materials, is coated on the contact surface that contacts the rails, so that the contaminants are effectively scraped off, the cleaning performance can be further improved, and the belt life can also be extended.

The retaining fixture (130) is not limited to a specific structure and shape, as long as the end of the cleaning belt (120) extended to the upper side of the roller (3*a*) can be fixed to the insertion receiver (110). In the illustrated example, the retaining fixture includes a first retaining fixture (131) and a second retaining fixture (132) that can be assembled in a mutually attachable and detachable way so that the cleaning belt (120) can be easily attached and released.

Figure 6:
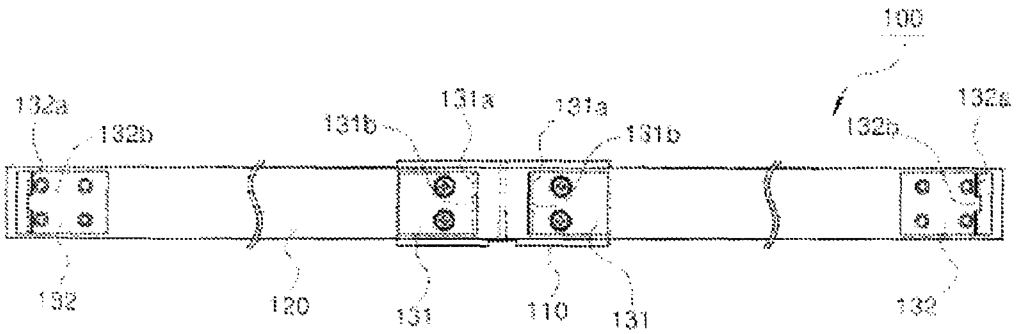
FIG. 6 is a plan view showing a state in which the first application example is developed.
Figure 7:
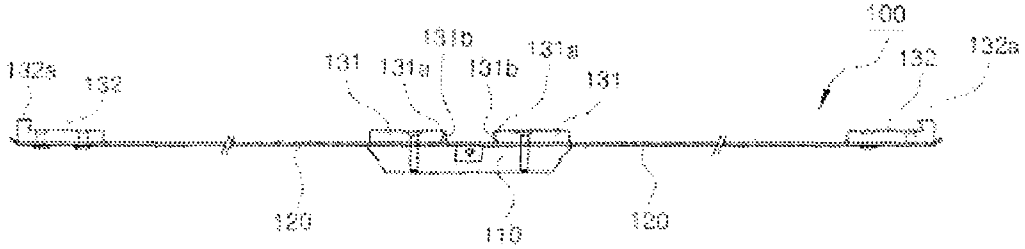
FIG. 7 is a side view of FIG. 6.
Figure 8:
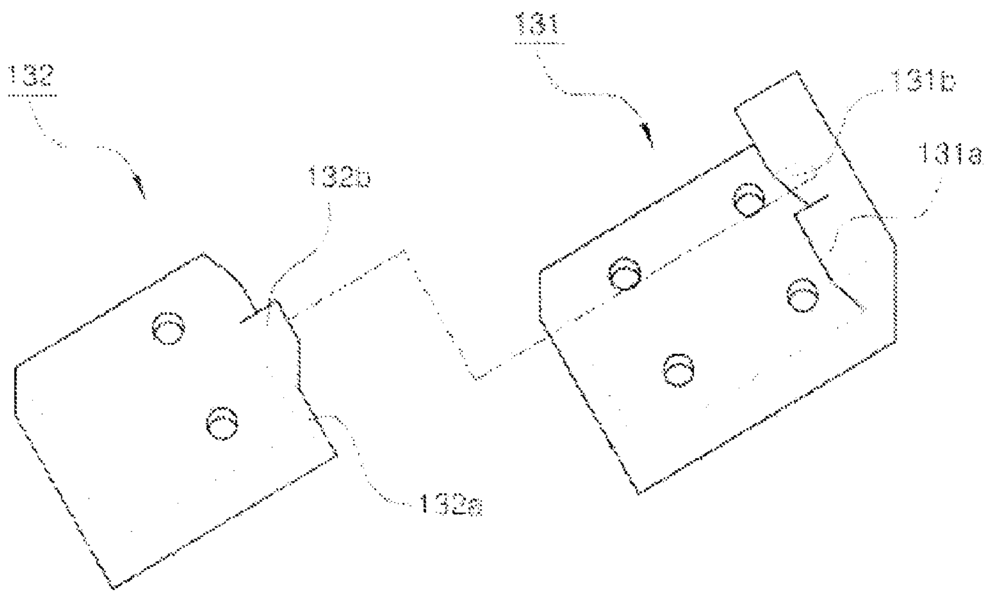
FIG. 8 is a side oblique view showing a process for installing the first application example of the cleaning apparatus of the present invention on rollers.

In the first application example, the first retaining fixtures (131), as shown in FIGS. 6-8, are equipped with hook catch parts (131*a*) projecting to the front (or rear) and respectively fixedly mounted at the front and rear of the upper part of the insertion part (110), and the second retaining fixtures (132) are equipped with hook parts (132*a*) that can be hooked and fixed onto the hook catch parts (131*a*) formed at the first retaining fixtures (131), and both the front and rear ends of the cleaning belt (120) can be respectively fixedly coupled.

Then, if a first anti-thrust part (131*b*) having a contact surface for forming a travel limit in the lateral direction is provided projecting (or recessed) in the first retaining fixture (131), especially in the hook catch part (131*a*) and a second recessed (or projecting) anti-thrust part (132*b*) is provided in the second retaining fixture (132), especially in the hook part (132*a*), so that the travel in the lateral direction is limited by the contact with the first anti-thrust part (131*b*), a stable connection structure can be realized in which thrust and separation in the forward and backward direction and the lateral direction are prevented.

Figure 9:
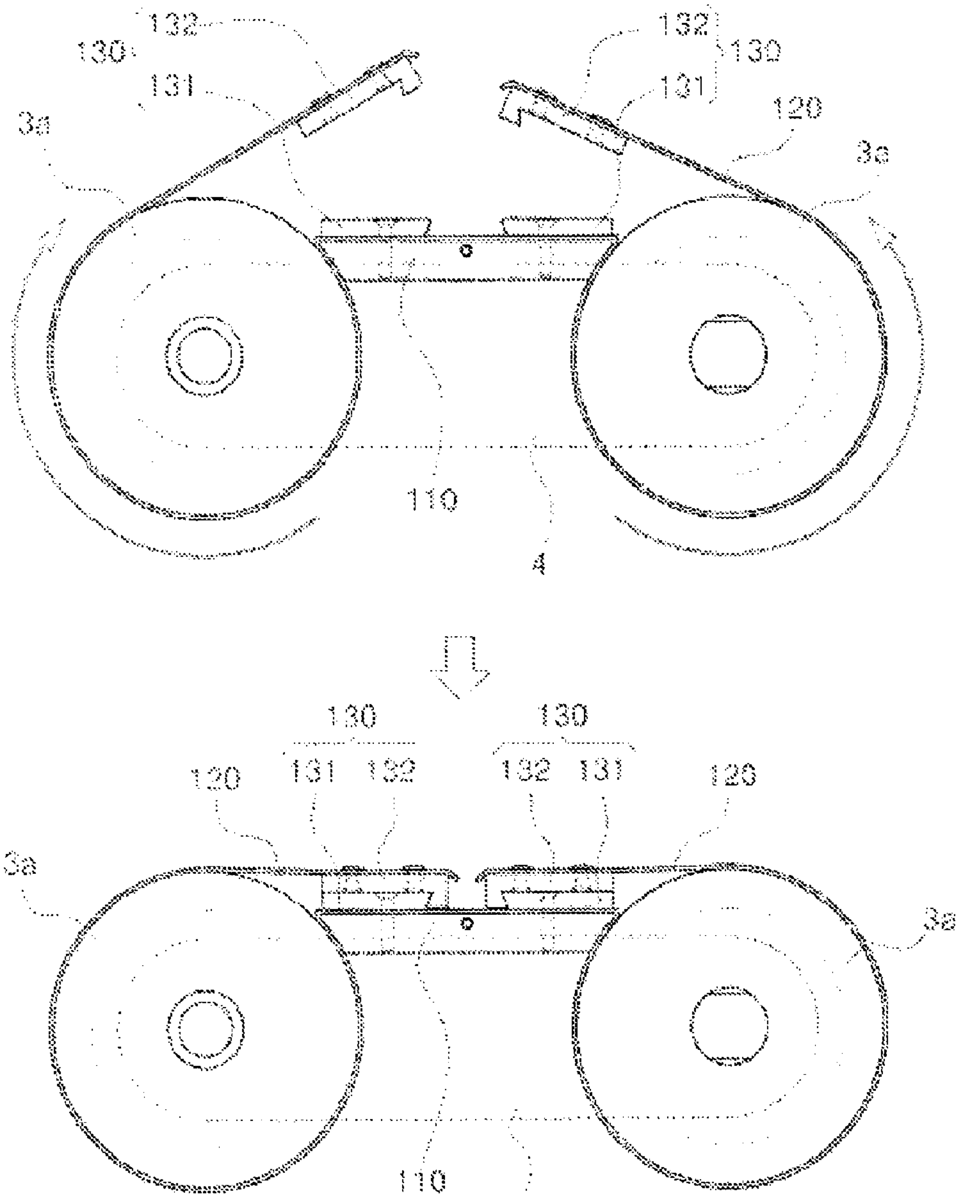
FIG. 9 is a side view showing a process for installing a separation preventer.

Therefore, in the first application example, as shown in FIG. 9, the insertion receiver (110) is inserted between the rollers (3*a*) such that the front and rear ends of the cleaning belt (120) extend below the insertion receiver, the outer surfaces of the rollers (3*a*) are enclosed by respectively extending the front and rear ends of the cleaning belt (120) to the front and rear and extending them above the rollers (3*a*). The second retaining fixtures (132) are respectively hooked on a pair of first retaining fixtures (131) fixedly mounted at the front and rear parts of the insertion receiver (110). Thus, a sturdy installation can be realized on the rollers (3*a*) with a simple assembly.

If the connection between the first retaining fixture (131) and second retaining fixture (132) is made with the second retaining fixture (132) connected to the front part of the first retaining fixture (131), the second retaining fixture (132) can be separated from the first retaining fixture (131) only when it can be moved toward the front. If a separation preventer (133) provided with a surface that contacts the second retaining fixture (132) is installed in a position contacting or adjacent to the front part of the second retaining fixture (132), the connection state between the first retaining fixture (131) and second retaining fixture (132) can be securely maintained, since the second retaining fixture (132) cannot be moved forward.

Figure 10:
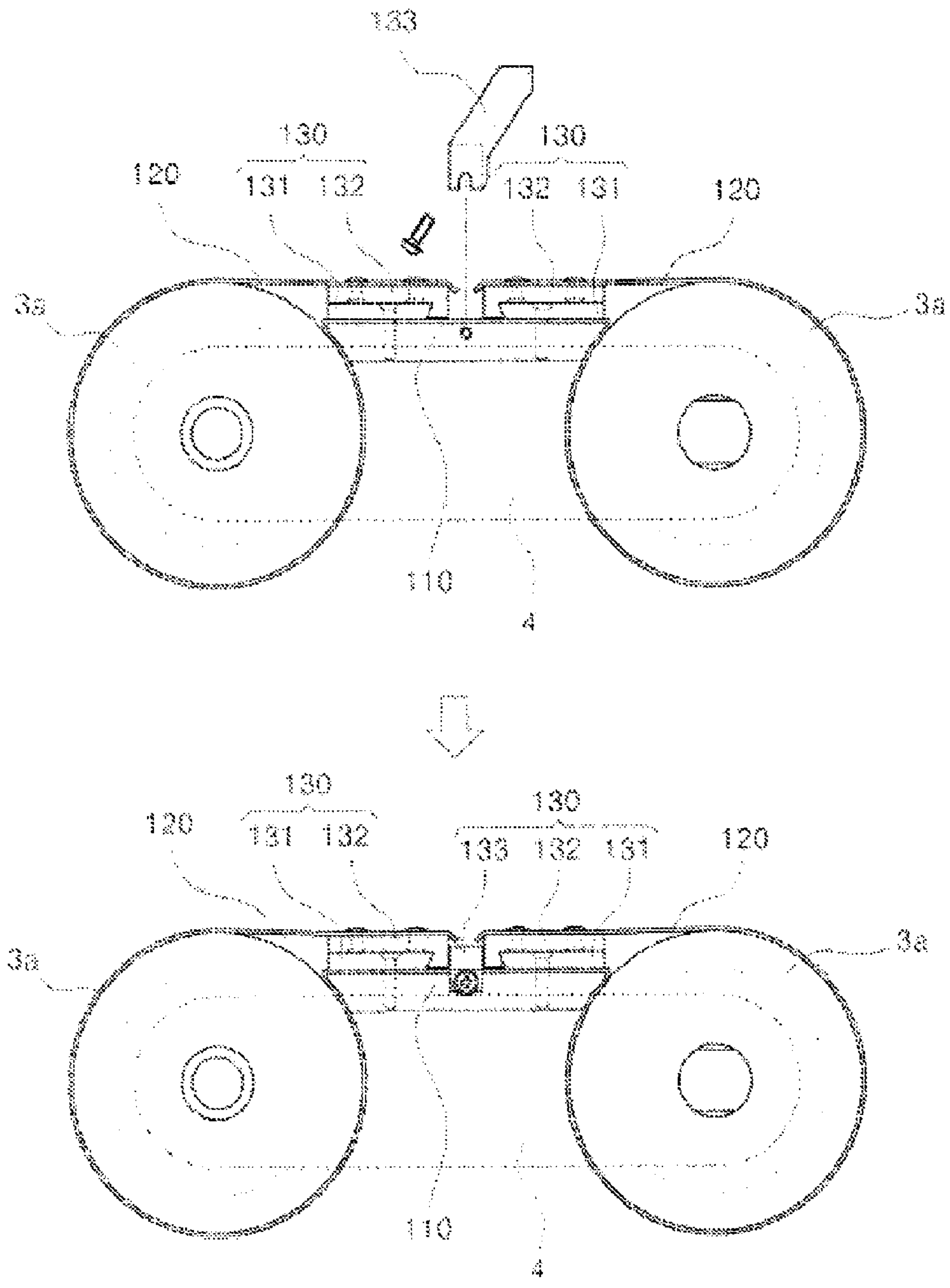
FIG. 10 is an oblique view showing a first application example of a first retaining fixture and a second retaining fixture.
Figure 11:
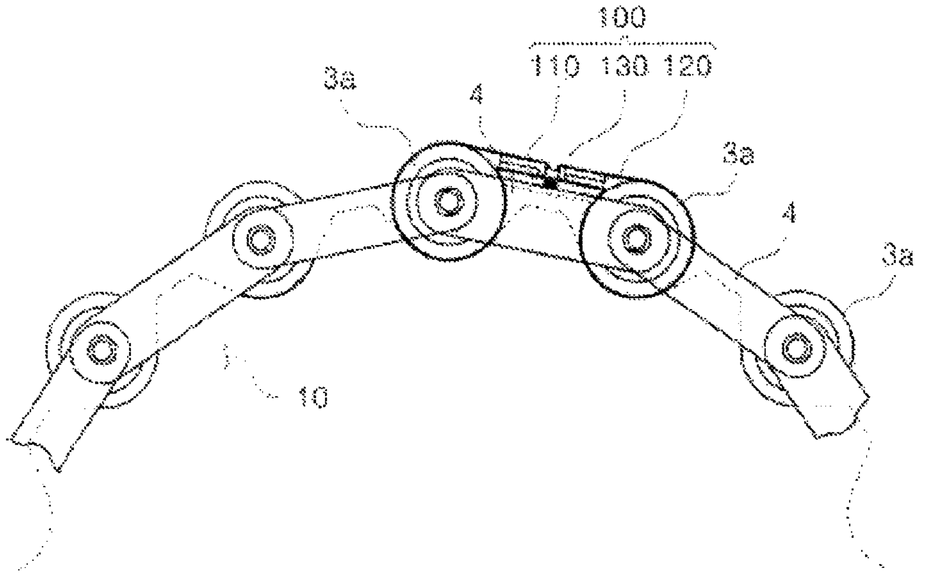
FIG. 11 is a side view showing the main parts in a state in which the rollers on which the cleaning apparatus of the first application example is installed are meshed with terminal gears.

When the first retaining fixtures (131) are respectively installed at the front and rear of the insertion receiver (110) and the second retaining fixtures (132) are respectively coupled in the separating space formed between the single pair of first retaining fixtures (131), as shown in FIG. 10, a separation preventer (133) with a volume and a shape corresponding to half of the separation space formed between the second retaining fixtures (132) is fixedly mounted in the separation space part between the second retaining fixtures (132) to create a state in which the sturdy connection of the second retaining fixtures (132) to the first retaining fixtures (131) can be maintained, even when the cleaning belt (120) contacting the rail surfaces experiences a deflection to one side from frictional pressure or the rollers (3*a*) rock.

In the present invention, the direction for moving the step position outside the truss (not shown in the figure) upward is described as toward the front (forward direction), and the upper and lower parts of the rollers are described, regardless of the state of the rollers in the truss, based on the state of coupling with the step positioned outside the truss.

In installing the insertion receiver (110) between the rollers (3*a*), if the insertion receiver is installed at a deflected position remote from the bottom of the rollers (3*a*), since the space part in which the gear teeth of the upper terminal gear and the lower terminal gear (hereinafter, generally called terminal gear (10)) can be maintained as is. The insertion receiver (110) neither connects nor collides excessively with the terminal gear (10), even when the rollers (3*a*) contact the terminal gear (10), and this cleaning apparatus can move continuously over the entirety of the rails of the escalator and clean these rails while safely passing through the terminal gears (10).

Also, this cleaning apparatus can be broadly applied to existing escalators, regardless of the installation of the terminal gear (10), and can be easily applied to escalators with different pitches of the step links (4) simply by changing the length of the cleaning belt (120), the insertion receiver (110), and the retaining fixture (130) for mounting the cleaning belt (120).

The second application example of the cleaning apparatus for escalator rails of the present invention will be explained in detail with reference to FIGS. 12-15.

Figure 12:
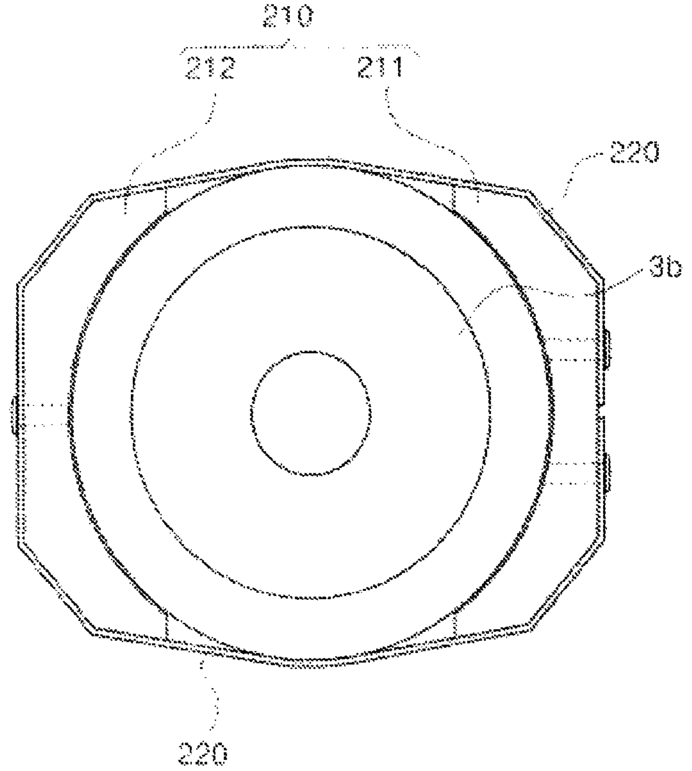
FIG. 12 is a side view showing a state in which the second application example of a cleaning apparatus for escalator rails of the present invention is installed on rollers.

The second application example of the cleaning apparatus for escalator rails of the present invention has a structure mainly consisting of a connector (210) and a cleaning belt (220) that is individually installed on each roller (3*b*), in contrast to the first application example. As shown in FIG. 12, the connector (210) has a coupled front and rear part so that free rotation of the roller (3*b*) is constrained, and the cleaning belt (220) is wrapped around the outer surface of the connector (210) and roller (3*b*) and fixedly coupled with the connector (210).

The connector (210) consists of a front connector (211) in contact with the front part of the roller (3*b*) and a rear connector (212) in contact with the rear part of the roller (3*b*). Since the second application example and the range of motion and the shape of the roller (3*b*) are differently realized in accordance with the shapes, structures, and installation positions of the front connector (211) and rear connector (212), these connectors are preferably applied in a shape appropriate to the structure of the rails and the motion state of the roller (3*b*) with which the second application example is employed.

The connector (210) in one example has a shape and structure such that the second application example of the present invention and the roller (3*b*) can rock to the front or rear within a prescribed angle range so that the cleaning belt (220) wrapped around the outer surface of the connector (210) is in full contact with the entire surface of the rails, allowing cleaning performance at a fixed level or higher to be realized, and preventing excessive pressure from being applied to the connector (210) and cleaning belt (220) and the rail surfaces when the rails are sharply curved passing through the upper and lower ends.

If the vertical width of the connector (210) is shorter than the diameter of the roller (3*b*), since the cleaning belt (220) has an angle of inclination upward (downward) forward and rearward of the bottom (or top) of the roller (3*b*), a shape can be realized enabling the motion. The connecting part between the upper and lower parts and the front or rear part of the connector (210) is preferably beveled or rounded so that frictional pressure can be prevented from being intensively applied to one side of the cleaning belt (220) by rocking of the roller (3*b*).

Figure 13:
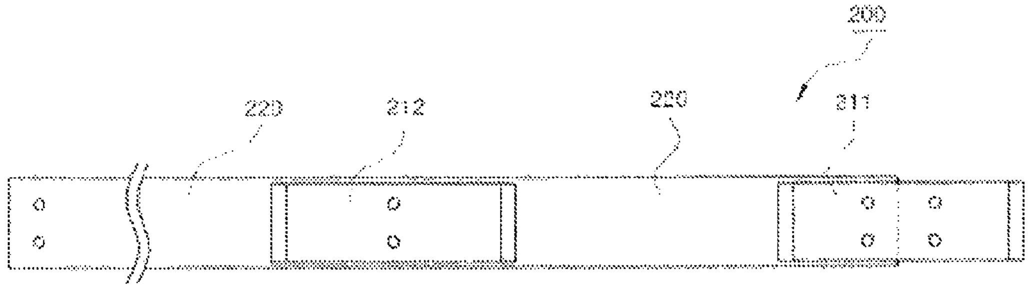
FIG. 13 is a plan view showing a developed state of the second application example.
Figure 14:
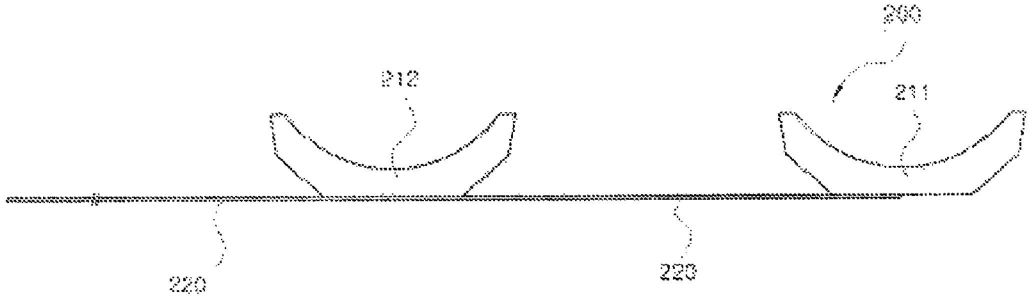
FIG. 14 is a side view of FIG. 13.
Figure 15:
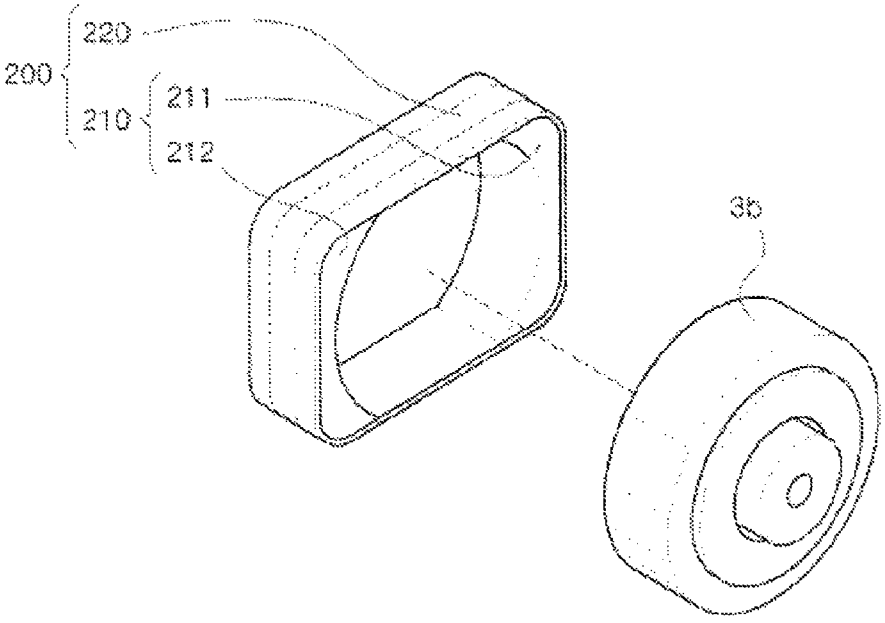
FIG. 15 is an oblique view showing a process for installing the cleaning apparatus of the second application example on a roller.

As shown in FIGS. 13 and 14, if the front connector (211) is coupled with one end of the cleaning belt (220) and the rear connector (212) is coupled with the middle part of the cleaning belt (220), the other end of the cleaning belt (220) is extended from the front connector (211) to the rear connector (212), encloses the side surfaces and upper and lower ends of the rear connector (212), and extends to the front connector (211), so that an assembly such as is shown in FIG. 15 is made possible, and installation can be easily realized by a simple operation of inserting into the roller (3*b*) into these members.

In general, the step chain rollers (3*a*) and the step rollers (3*b*) coupled to the step to the rear of the step chain rollers (3*a*) are respectively coupled with the bottom parts of the escalator steps, and front wheel rails and rear wheel rails (not shown in the figure) for respectively guiding the step chain rollers (3*a*) and step rollers (3*b*) form paths independent of each other and are installed in the truss. The structure as shown in the first application example is suitably applied to the cleaning apparatus of the front wheel rails, since it is installed on the step chain rollers (3*a*), taking into consideration the contact with the terminal gear (10), and the structure as shown in the second application example is suitably applied to the cleaning apparatus of the rear wheel rails since it is installed on the step rollers (3*b*), taking into consideration the contact with the rear wheel rails, having a path in which they can continuously advance through a rolling and sliding motion.

In the explanation of the first application example and second application example, the rollers (3*a*) and the rollers (3*b*) have been separately indicated in view of these structures.

According to the rail cleaning apparatuses (100, 200) of the present invention, by continuously operating the escalator forward and backward, regardless of the installation position, the front wheel rails and rear wheel rails can be more easily cleaned with a high degree of completeness, and since excessive contact and collision with the escalator structure are not generated, the safety of the escalator structure can be guaranteed.

Also, since the cleaning belts (120, 200) can be wrapped around the step chain rollers (3*a*) or step rollers (3*b*) and fixed at regular positions, the manufacturing cost can be further reduced by the simplicity of structure, and with the utilization of belt members of small volume, the cleaning belts can be freely installed by utilizing the separation space part formed between the step chain rollers (3*a*) and step rollers (3*b*).

Then, since it is not necessary to additionally mount separate mechanisms such as detection sensors in the escalator structure, or to change an existing escalator structure, the rail cleaning apparatus can be simply installed, the installation cost can be markedly reduced, and since the rail cleaning apparatus can be installed at any position on the motion path of the step chain rollers (3*a*) or step rollers (3*b*), the rail cleaning apparatus can be safely installed and removed at a position where safety is secured, even without the entry of a worker into the truss.

Also, in fixing the cleaning belt (120) to a pair of step chain rollers (3*a*), the cleaning belt can be installed and disassembled by means of a simple assembly that hooks or separates the second retaining fixture (132) onto or from the first retaining fixture (131), and in mounting the cleaning belt (220) to one step roller (3*b*), the cleaning belt can be easily assembled or disassembled by a simple operation of placing it over or separating it from a step roller (3*b*) in a state in which the connector (210) and the cleaning belt (220) are integrated.

One feature of the disclosed examples is that they provide a cleaning apparatus for escalator rails that can safely pass through upper and lower terminal gears, along with rollers and step chains, during ascent and descent, so that the entire track of the rails of an escalator can be cleaned during continuous movement.

Another feature of the disclosed examples is that they provide a cleaning apparatus for escalator rails that can be realized with a simpler structure, markedly reduce the cost required for manufacture and installation, since additional operations such as attachment of detection sensors are not required, and that can be safely installed and removed, even without the entry of a worker into a truss.

With the disclosed examples, if an assembly in which the cleaning belt is coupled with the outer surface of the rollers is installed at an offset position separated from the part that contacts the gear teeth of the upper and lower terminal gears, since the space between the rollers into which the gear teeth of the upper and lower terminal gears are to be introduced can be maintained, this rail cleaning apparatus can move continuously over the entire track of the escalator rails and carry out cleaning while safely passing through the upper and lower terminal gears.

The rails can therefore be easily cleaned with a high degree of completeness during continuous forward or backward operation of the escalator, regardless of the position where the rail cleaner is installed, and since excessive contact and collision with the escalator structure are not generated, the safety of the escalator structure can be secured.

Also, this rail cleaning apparatus can be realized with a simple structure that wraps the cleaning belt around the rollers and fixes it at a regular position, so that the manufacturing cost can be further reduced, and with the utilization of a belt of small volume, the cleaning belt can be freely installed by utilizing the separation space part between the rollers.

Then, since it is not necessary to additionally mount separate mechanisms such as detection sensors in the escalator structure or to change an existing escalator structure, the rail cleaning apparatus can be simply installed, the installation cost can be markedly reduced, and the rail cleaning apparatus can be safely installed and removed from a position where safety is secured, even without the entry of a worker into the truss.

Also, this cleaning apparatus can be broadly applied to existing escalators, regardless of whether driving is carried out in a state in which the rollers are connected to the gear teeth, and this cleaning apparatus can also be applied to escalators with different step chain pitches simply by changing the length of the cleaning belt and the assembly for fixing the cleaning belt, so that its compatibility is excellent.

By constituting the assembly for forming the cleaning belt with a first retaining fixture and a second retaining fixture that can be assembled such that they can be attached and detached to and from each other, since the hook catch part, the hook part, the first anti-thrust part, and the second anti-thrust part are provided to the interconnecting part, a stable connection structure can be realized in which thrust and separation in the forward and backward direction and in the lateral direction are prevented. With the additional installation of a separation preventer for securing the connection state between the first retaining fixture and the second retaining fixture, a sturdy connection state can be maintained, even when the cleaning belt in contact with the rail surface is continuously subjected to frictional pressure.

Also, in fixing the cleaning belt to a pair of rollers, the assembly for fixing the cleaning belt consists of a first retaining fixture and a second retaining fixture that can be assembled such that they can be attached and detached to and from each other, and the cleaning belt can be assembled and disassembled by a simple operation of hooking the second retaining fixture onto or separating it from the first retaining fixture. In fixing the cleaning belt to a single roller, they can be assembled and disassembled by a simple operation of inserting the cleaning belt into or separating it from the roller in a state in which the assembly for fixing the cleaning belt is integrated with the cleaning belt.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The invention claimed is:

1. A cleaning apparatus for passenger conveyor rails, comprising:

an insertion receiver adapted to be installed in a separation space between rollers of an associated passenger conveyor;

at least one cleaning belt that extends from the insertion receiver for wrapping at least partially around the rollers where at least a portion of the cleaning belt is positioned to contact a rail that guides movement of the rollers; and a retaining fixture that secures ends of the at least one cleaning belt in a fixed position relative to the insertion receiver.

2. The cleaning apparatus of claim 1, wherein the insertion receiver has a front to rear length corresponding to the separation gap between the rollers.

3. The cleaning apparatus of claim 1, wherein the insertion receiver is installed with a separation gap from bottoms of the rollers.

4. The cleaning apparatus of claim 1, wherein the at least one cleaning belt comprises a fibrous material in which cotton fibers and synthetic fibers are blended.

5. The cleaning apparatus of claim 1, wherein the at least one cleaning belt comprises a sandpaper grit layer.

6. The cleaning apparatus of claim 1, wherein the retaining fixture includes a first retaining fixture fixedly mounted on the insertion receiver and equipped with a hook catch part projecting to one side, and a second retaining fixture fixedly coupled with one end of the cleaning belt and equipped with a hook part which can be hooked and fixed to the hook catch part.

7. The cleaning apparatus of claim 6, wherein the first retaining fixture includes a first anti-thrust part that is equipped with a contact surface for forming a travel limit in a lateral direction and the second retaining fixture includes a second anti-thrust part so that movement in the lateral direction is limited by contact with the first anti-thrust part.

8. The cleaning apparatus of claim 6, comprising a separation preventer equipped with a surface that contacts the second retaining fixture and fixedly mounted on the insertion receiver or first retaining fixture to prevent separation of the second retaining fixture in a state in which the second retaining fixture is connected to the first retaining fixture.

9. A cleaning apparatus for passenger conveyor rails, comprising:

a front wheel rail cleaner equipped with an insertion receiver installed in a separation space between step chain rollers of an associated passenger conveyor;

at least one cleaning belt that extends from the insertion receiver for at least partially wrapping around the step chain rollers;

a retaining fixture for securing ends of the at least one cleaning belt in a fixed position relative to the insertion receiver;

a rear wheel rail cleaner equipped with a first connector adapted to be connected to one part of a step roller of the associated passenger conveyor;

a second connector adapted to be connected to another part of the step roller; and a rear wheel rail cleaning belt adapted to extend around the first and second connectors with the connectors between the belt and the step roller, wherein at least a portion of the rear wheel cleaning belt is positioned to contact a rail that guides movement of the step roller.

* * * * *